Patented Mar. 9, 1954

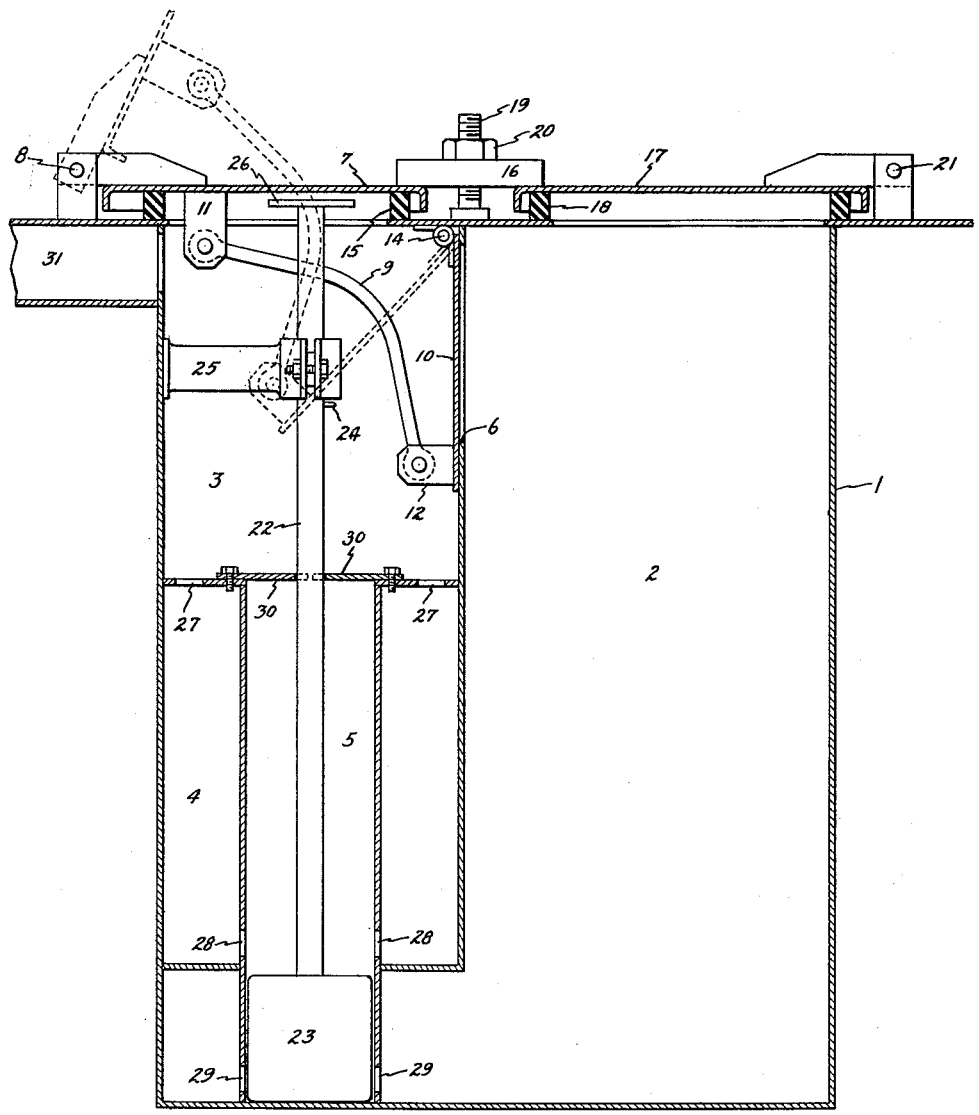

2,671,468

UNITED STATES PATENT OFFICE 2,671,468

FILLING AND MEASURING ARRANGEMENT FOR LIQUID STORAGE TANKS

Karl J. Ahnell, Erie, Pa., assignor to General Electric Company, a corporation of New York Application December 30, 1952, Serial No. 328,751

3 Claims. (Cl. 137—574)

My invention relates to filling and measuring arrangements for liquid storage tanks and more particularly to such arrangements for preventing overflow from the charging opening of a storage tank during the filling thereof.

My invention is particularly applicable to fuel storage tanks forming part of the superstructure of a locomotive. Fuel is usually supplied to such storage tanks at a very rapid rate so that standby periods during such fueling are reduced to a minimum. Consequently it is not always possible to shut off the flow of fuel to the tank in sufficient time to prevent overflow and spilling from the tank. In the case of a fuel tank for a locomotive, this overflow is usually spilled over the roof of the locomotive cab and is productive not only of fire hazards, but also results in an unsightly appearance of the exterior of the locomotive cab which is coated with the overflow oil.

It is an object of my invention to provide a liquid storage tank with an overflow receiving compartment which is connected with its storage compartment when a cover for the overflow compartment is opened in order to make accessible the indicating rod of a liquid level measuring apparatus which is normally latched in a retracted position within this overflow compartment.

It is also an object of my invention to provide in such an arrangement an overflow return compartment which includes a chamber for the float of the liquid measuring apparatus and has passageways therethrough between the bottom of the overflow compartment and the bottom portion of the storage compartment which restrict the flow of liquid from the storage compartment so that back flow from the storage compartment through the overflow return compartment to the overflow compartment will not occur during normal filling of the storage tank and thus limits liquid supply to the overflow compartment through the overflow passageway between it and the top portion of the storage compartment.

Further objects of my invention will become apparent from the following description of the particular embodiment thereof illustrated in the accompanying drawing.

In accordance with the embodiment of my invention illustrated in the accompanying drawing, the indicating rod of a liquid level measuring device for a liquid storage tank extends into and is latched in a retracted position in a compartment which receives the overflow from the storage compartment of a fuel tank. This overflow compartment has an interconnecting passageway with the top portion of the storage compartment of the tank and this passageway is provided with a cover which is opened and closed by the opening and closing of a cover for the top portion of the overflow compartment which when opened permits the indicating rod of the measuring device to be unlatched for movement in response to the liquid level in the storage compartment of the tank. The overflow compartment of the tank is connected through an overflow return compartment with the storage compartment of the tank through passageways which limit the flow of liquid therebetween so that the overflow compartment will not be filled by liquid from the storage compartment during charging of the storage compartment at rates that may result in overflow from the storage compartment before the supply of liquid thereto can be shut off.

The single figure of the drawing is a side sectional view of a liquid storage tank embodying the features of my invention.

As shown in this drawing, a liquid storage tank 1 is provided with a storage compartment 2, an overflow compartment 3, and an overflow return compartment 4 including a chamber 5 extending therethrough and constituting part of the liquid level measuring apparatus for the tank. The overflow compartment 3 is located in the top portion of the storage compartment 2 and is connected therewith by an intercommunicating passage 6 through which overflow liquid may be discharged from the storage compartment into the overflow compartment. The overflow compartment 3 has an opening in its top which is provided with a cover 7 which is hinged at 8 to the tank structure or to the superstructure of the locomotive cab of which the storage tank forms a part. This cover 7 is mechanically connected through a bent lever 9 to a cover 10 which in its closed position covers the passageway 6 between the storage compartment 2 and the overflow compartment of the tank. Lever 9 has its ends pivotally connected with covers 7 and 10 through lugs or brackets 11 and 12 which are respectively connected thereto. Cover 10 for closing the overflow passageway 6 between storage compartment 2 and overflow compartment 3 is hinged at 14 to part of the tank structure. The arrangement is such that when the cover 7 is opened, the cover 10 is also opened, and when cover 7 is closed, the cover 10 is also closed. In the drawing the parts have been illustrated in full lines with the covers closed and in dotted lines with the covers partly opened in order to show the working arrangement of these parts.

Cover 7 is held in its closed position against a gasket 15 by a clamping bar 16 which also engages and holds a cover 17 in engagement with a gasket 18 for closing the charging opening in the top of the storage compartment of the fuel tank. Clamping bar 16 is mounted for turning movement on a threaded stud 19 which is attached to the top of the tank structure. In the position illustrated in the drawing, it is held in clamping engagement with covers 7 and 17 by means of a nut 20 which is threaded on stud 19 and engages clamping bar 16. By releasing nut 20 and turning clamping bar 16 through 90°, both of the covers 7 and 17 are released for opening. Cover 17 is attached to the tank structure or the superstructure of the locomotive cab through a hinged connection 21.

The overflow compartment 3 also serves to retain in retracted position the measuring rod 22 of a liquid level measuring apparatus forming part of tank 1. In the arrangement shown, measuring rod 22 is connected at its lower end to a float 23 which has a snug fit in chamber 5 which extends through the overflow return compartment 4 and acts as a guide for float 23. Measuring rod 22 and float 23 are held in their retracted position by a latching mechanism supported within the overflow compartment 3. In the arrangement shown this latching mechanism comprises a pin 24 mounted on the measuring rod 22 which engages a guide 25 for the upper end of the measuring rod. Guide 25 is mounted at one end on an inside wall of the tank structure and has at its other end a separable connection formed of parts which act as guides for the measuring rod. These separable parts of guide 25 are spaced from one another by an amount sufficient for the passage of pin 24 of measuring rod 22 when this rod is turned in order to match the position of the pin with the passageway between these separable parts. The upper end of measuring rod 22 may be provided with a handpiece 26 to facilitate turning of the measuring rod 22 for latching and unlatching the same from its guide 25. It is to be understood that the measuring rod 22 will usually be provided with graduations indicating the amount of liquid in the fuel tank and these graduations may be read with regard to guide 25 which would then also serve as an indicator for the measuring rod.

The bottom of the overflow compartment 3 is connected through an overflow return compartment 4 with the bottom portion of storage compartment 2 of tank 1 through passageways 27, 28 and 29. Passageways 27 connect the bottom of overflow compartment 3 to the top of the overflow return compartment 4. Passageways 28 connect the bottom portion of the overflow return compartment with chamber 5, whose bottom portion is connected with the storage compartment 2 through passageways 29. One or both of the passageways 28 and 29 are restricted in area to dampen the flow of liquid from the storage compartment 2 during filling thereof so that the level of liquid in overflow return compartment 4 or overflow compartment 3 will not rise as rapidly as the level of liquid in storage compartment 2 during filling of the tank at its maximum rate of charging. The relative size of passageways 28 and 29 depends on the relative size of the compartments 4 and 5, as well as the maximum filling rate of the tank 2. The passageways 28 should be restricted sufficiently to prevent the chamber 4 from filling at the same rate as the tank 2 so that there will be available space for overflow in the chambers 3 and 4 when the liquid level of the chamber 2 reaches the overflow passageway 6. However, the passageways 28 should be large enough to permit drainage of the chambers 3 and 4 at a rate equal to the maximum rate of drainage from the tank 2. It is apparent that the use of the measuring arrangement such as the one disclosed requires that the tank have a maximum filling rate much greater than the discharge rate making it feasible to have considerable latitude in the amount of restriction of passageways 28. The passageways 29 from storage compartment 2 to chamber 5, are, however, of sufficient size to keep the liquid level in chamber 5 the same as the liquid level in storage compartment 2 so that the float 23 of the liquid level measuring apparatus will be fully responsive to the liquid level in storage compartment 2 of tank 1. The top of chamber 5 is closed by complementary sections 30 of a cover which is attached to the bottom of the overflow compartment 3. By removing this cover and disassembling the separable members of guide 25 for measuring rod 22, it is apparent that this rod and its float 23 may be removed from the tank for cleaning and repair and for providing access to the several compartments for inspection and cleaning thereof.

The top portion of the overflow compartment 3 is provided with a discharge duct 31 so that if the fuel supply for the storage compartment is not shut off until after the spillover has also filled the overflow compartment 3, the liquid in the overflow compartment may discharge through duct 31 overboard, instead of escaping through the openings in the top of the cab structure which are at the time uncovered due to the fact that covers 7 and 17 are in their open positions. Once the fuel supply has been added to the tank, any overflow into compartment 3 will find its way back to the storage compartment through the overflow return compartment and the intercommunicating passageways between these compartments. Furthermore, after a fuel charging operation, the measuring rod 22 will be secured in its retracted and latched position within this overflow compartment 3 and covers 7 and 17 closed and held against gaskets 15 and 18 by clamping bar 16 to prevent spilling of liquid from compartments 2 and 3 during buffing of the locomotive. The closure of cover 7 will also result in closure of its connected cover 10 for overflow passage 6 and consequently fuel cannot thereafter be splashed from compartment 2 into compartment 3.

From the above description of one embodiment of my invention, it is apparent that I have provided a liquid storage tank which may be filled at a very rapid rate without encountering the risk of overflow through the charging opening of the tank and the consequent hazards and soilage resulting from such overflow. Furthermore, means have been provided in which an overflow compartment for the tank serves its intended purpose as an overflow compartment and also forms part of the tank structure employed for enclosing a liquid level measuring apparatus embodied in the tank structure. When this liquid level measuring apparatus is uncovered for use of the same, this action immediately renders operative its enclosing compartment for use as an overflow compartment for the main storage compartment of the tank.

It is quite obvious that the arrangement of the compartments, their relative sizes, the type of liquid level measuring apparatus employed and the several other features of the particular embodiment illustrated may be variously modified without departing from the spirit and scope of my invention. I therefore intend in the appended claims to cover all such variations and modifications which come within the true spirit and scope of my invention.

What I claim as new and desire to secure by Letters Patent of the United States is:

1. A liquid storage tank having partitions therein dividing it into a storage compartment, an overflow compartment located in the top portion of said storage compartment, and an overflow return compartment located between said overflow compartment and the bottom portion of said storage compartment, said main compartment and said overflow compartment having a passage area therebetween at the top of said storage compartment for discharging overflow liquid from said storage compartment to said overflow compartment and said overflow return compartment having a passage area communicating respectively with the bottom of said overflow compartment and the bottom portion of said storage compartment with openings in the lower portion of said passage area for restricting liquid flow therethrough to a predetermined rate less than the maximum charging rate of said storage compartment.

2. A liquid storage tank having partitions therein dividing it into a storage compartment and an overflow compartment located in the top portion of said storage compartment, said storage compartment having an opening at its top through which liquid may be supplied thereto and an overflow passage area between its top portion and said overflow compartment, and said overflow compartment having a passage area between its bottom and said storage compartment which limits liquid flow therebetween to a predetermined rate less than the charging rate of said storage compartment, measuring apparatus including an indicating rod and means for moving said rod in response to the liquid level in said storage compartment, said indicating rod extending through said overflow compartment and being movable by said measuring apparatus through an opening in the top of said overflow compartment when said opening is not covered, covers for the top openings in said main and said overflow compartments and for said overflow passage area between said main and said overflow compartments, and means for opening and closing the cover for said overflow passage area between said main and said overflow compartments in response to the opening and closing of said cover for the opening in the top of said overflow compartment.

3. A liquid storage tank having partitions therein dividing it into a storage compartment and an overflow compartment located in the top portion of said storage compartment, said storage compartment having an opening at its top through which liquid may be supplied thereto and an overflow passage area between its top portion and said overflow compartment, and said overflow compartment having a passage area between its bottom and said storage compartment which limits liquid flow therebetween to a predetermined rate, less than the charging rate of said storage compartment, measuring apparatus including an indicating rod and means for moving said rod in response to the liquid level in said storage compartment, said indicating rod extending through said overflow compartment and being movable by said measuring apparatus through an opening in the top of said overflow compartment when said opening is not covered, a guide attached to the inside wall of said overflow compartment and making a sliding engagement with said indicating rod, latching means between said guide and said indicating rod for holding said rod in a retracted position wholly within said overflow compartment, covers for the top openings in said storage and said overflow compartments and for said overflow passage area between said storage and said overflow compartments, means for opening and closing said cover for said overflow passage area between said storage and said overflow compartments in response to the opening and closing of said cover for the opening in the top of said overflow compartment, and a fluid discharge duct extending from the top portion of said overflow compartment.

KARL J. AHNELL.

References Cited in the file of this patent

UNITED STATES PATENTS

| Number | Name | Date |
|---|---|---|
| 1,790,968 | Bauline | Feb. 7, 1931 |